United States Patent [19]
Minakawa et al.

[11] B  3,924,821
[45] Dec. 9, 1975

[54] GUIDING DEVICE FOR AN AUTOMATIC FILM LOADER

[75] Inventors: Yoshinari Minakawa, Nishinomiya; Akinobu Sashida, Itami, both of Japan

[73] Assignee: Eiki Industrial Co., Ltd., Japan

[22] Filed: Oct. 10, 1973

[21] Appl. No.: 405,160

[44] Published under the Trial Voluntary Protest Program on January 28, 1975 as document no. B 405,160.

[30] Foreign Application Priority Data
Feb. 3, 1973 Japan.............................. 48-14167

[52] U.S. Cl. .................. 242/195; 242/205; 226/91; 352/157
[51] Int. Cl.²...................... G03B 1/04; G11B 15/32
[58] Field of Search ...... 242/76, 195, 205; 352/157, 352/158; 226/91, 92

[56] References Cited
UNITED STATES PATENTS
3,712,558  1/1973  Johnson et al...................... 242/195
3,712,719  1/1973  Zanner, Jr. ........................... 352/73

*Primary Examiner*—Leonard D. Christian
*Attorney, Agent, or Firm*—Wenderoth, Lind & Ponack

[57] ABSTRACT

A guiding device for an automatic film loader in a projector is disclosed. The guiding device includes a guide plate pivoted at one end thereof by a shaft and adapted to guide a film into a winding reel, an engaging pin connected to the other end of the shaft through an intermediary of an arm, a first link pivoted at the lower end thereof, and a second link adapted to turn integrally with the first link. The second link has a hook engageable with the engaging pin. The first link has a roller at the upper end thereof adjacent the pivot of the guide plate. When the roller of the first link is drawn towards the guide plate by the tension of the film, the end of which is caught by the winding reel, the hook of the second link disengages from the engaging pin to cause the guide plate to extend from the winding reel while turning around the pivot thereof.

5 Claims, 4 Drawing Figures

GUIDING DEVICE FOR AN AUTOMATIC FILM LOADER

The present invention relates to a guiding device for an automatic loader which is equipped in a projector or a tape recorder and which automatically winds a film or sound recording tape.

In this kind of automatic loader, it is necessary to remove a film guide from a winding reel after the film has been caught by a drum of the winding reel. According to conventional devices, for example there was a device in which the film guide was removed from the reel by the pressure caused by the tension of the film against the film guide when the film was wound around the reel. In another device, the film guide was removed from the reel by the pressure caused by the increase of the thickness of the film wound around the drum of the winding reel. However, it was heretofore necessary to provide a delicate spring for holding the film guide, resulting in the inadvertent removal of the film guide before the top of the film was completely caught by the drum of the reel, thereby making the winding of the film uncertain. There was a further device for electrically removing the film guide out of the reel, but it was expensive because of its complicated mechanism.

A primary object of the present invention is to obviate the defects of the conventional devices, and to provide a guiding device in which a film guide is securely held so that the top of the film guide is inserted in the winding reel to correctly guide the film therein until the end portion of the film is completely caught by the drum of the reel and when it is no longer necessary to guide the film by the film guide, since the end portion of the film is wound around the reel, the film guide is automatically removed from the winding reel so as not to disturb the further winding by the reel.

The above and further objects of the present invention will become apparent from the following description of the invention in reference to the accompanying drawings, in which.

Figure 1:
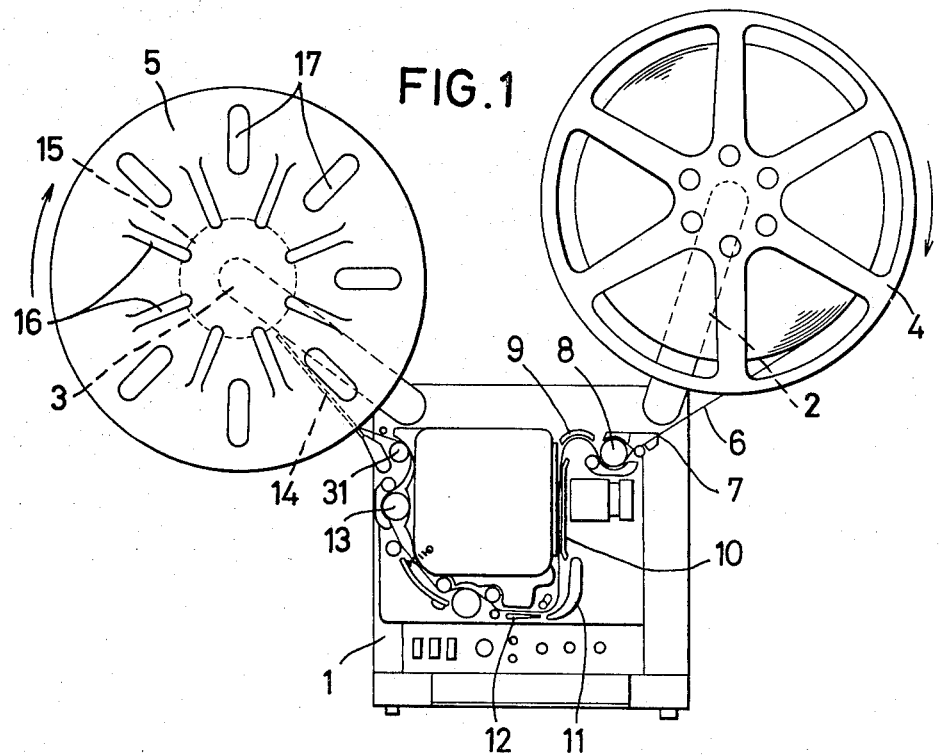
FIG. 1 is a side elevation view of a projector incorporated with a guiding device according to the present invention.

Referring now to FIG. 1, a reel 4 and a winding reel 5 are rotatably mounted at the front and rear, respectively, of a projector body 1 by means of arms 2 and 3 respectively, said reels 4 and 5 being adapted to rotate in the direction of the arrows by a suitable driving mechanism when the projector starts.

A film 6 is wound around the reel 4, and when the end of the film 6, extending from the reel 4, is inserted in a film entry 7 after the projector starts, the film 6 is driven by a first sprocket 8 which is rotating and then enters in a film gate 10 while being guided by an upper film guide 9. The film 6 then travels through lower film guides 11 and 12 to a second sprocket 13. The film 6 delivered by the second sprocket 13 is guided through a guide 14 to a reel drum 15 positioned at the center of the winding reel 5. Said guide 14 is adapted to slightly press the reel drum 15 at the top thereof.

Any winding reel which has an automatic catching mechanism for the end of the film can be used. The winding reel 5 shown in the drawings has a plurality of tongues 16 which are formed by U-shaped slits radially formed in both flanges of the winding reel, said tongues 16 being bent slightly inwardly and serving as a spring. The end of the film inserted in the reel 5 is nipped by the opposed resilient tongues 16 to be wound around the drum 15 of the reel 5. Furthermore a plurality of projections 17 are radially provided on the inside faces of the opposed flanges of the reel 5 in order to prevent the curled film 6 from separating from the guide 14.

Figure 2:
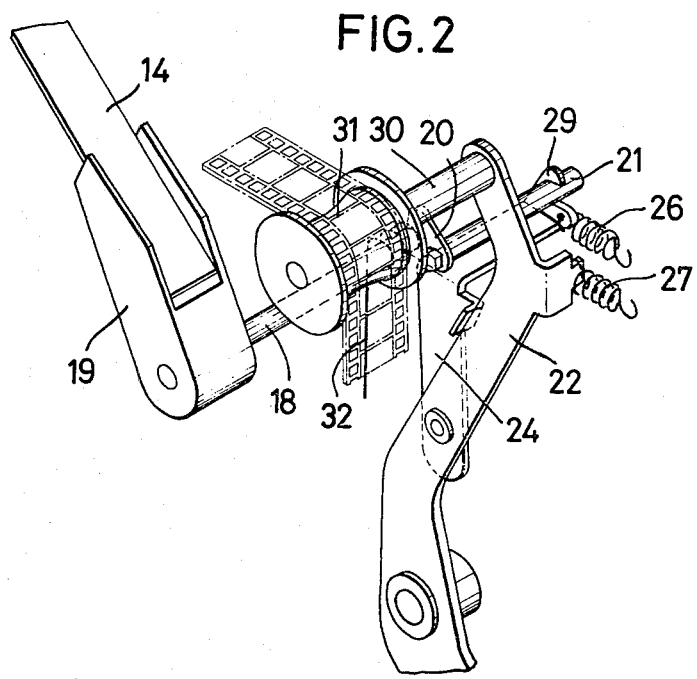
FIG. 2 is an enlarged perspective view of the guiding device of the present invention.
Figure 4:
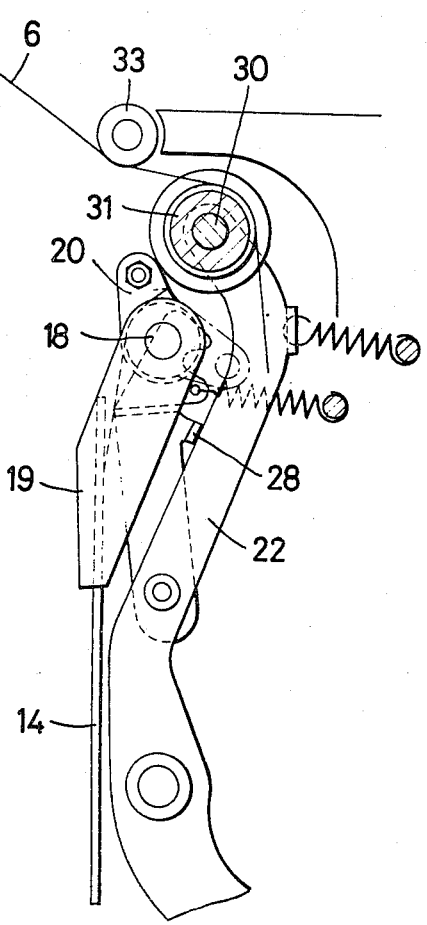
FIGS. 3 and 4 are enlarged side views showing the operation of the guiding device, partially broken.
Figure 3:
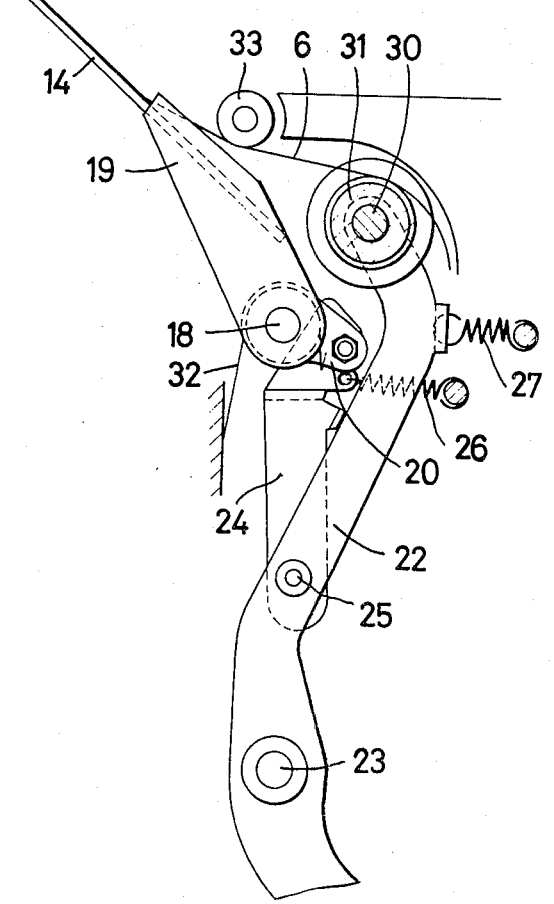

As shown in FIGS. 2 to 4, said guide 14 is fixed to a guide holder 19 which is fixed to one end of a shaft 18 which is rotatably mounted on the projector body 1. An arm 20 is fixed to the other end of said shaft 18, and an engaging pin 21 is fixed to the end of said arm 20.

The numeral 22 is a rocking link pivoted on the projector body 1 by means of a shaft 23, a shaft 30 being fixed to the upper end of said link 22, and a roller 31 being rotatably mounted on the sahft 30. The film 6 passes along the roller 31 when travelling from the second sprocket 13 towards the guide 14.

At the middle of said rocking link 22 is pivoted another link 24 at the lower end thereof by a pin 25, said link 24 formed substantially in shape of an L. A stopper 28 is provided at the vertical portion of the link 24 so as to abut the edge of the rocking link 22, a hook 29 being formed at the horizontal portion of the link 24. Said hook 29 is adapted to keep the guide 14 inserted into the reel 5 by the engagement with the engaging pin 21 after the top of the guide 14 is inserted between the flanges of the reel 5.

Said links 22 and 24 are biased rightwardly by springs 26 and 27 respectively whereby the link 24 moves integrally with the link 22 according to its rocking movement. The link 22 can therefore be formed integrally with the link 24.

In the operation of the guiding device as mentioned above, initially the top of the guide 14 is inserted into the reel 5 by engaging the engaging pin 21 with the hook 29, as shown in FIG. 1. The end of the film 6 in the reel 4 is then inserted into the film entry 7 and is wound around the drum of the winding reel 5 through the second sprocket 13 and the guide 14 as mentioned before. At this time the film 6 passes along the roller 31 at the opposite side of the guide holder 19 and along the lower side of guide roller 33 rotatably mounted on the projector body 1.

When the film 6 begins to coil round the drum 15 of the reel 5, the film strains between the second sprocket 13 and the reel 5. The roller 31 is drawn towards the guide holder 19 by the tension of the film 6 to cause the rocking link 22 to rotate together with the link 24, counterclockwise, i.e., towards the guide holder 19 thereby disengaging the engaging pin 21 from the hook 29 which is integral with the link 24.

Since the guide 14 is biased counterclockwise by means of the spring 32, when the engaging pin 21 disengages from the hook 29 as mentioned above, the guide 14 rotates around the shaft 18 and is downwardly removed from the reel 5 as shown in FIG. 4. As a result the film 6 is further wound around the reel without interruption of the guide 14.

For the convenience of reengaging the engaging pin 21 with the hook 29, the upper edge of the hook 29 is inclined downwardly towards the opening thereof, thereby enabling the engaging pin 21 to smoothly engage the hook 29 through the slant formed on the upper edge of the hook 29 while pressing the hook 29 downwardly when the guide is turned clockwise from the condition as shown in FIG. 4.

As described above according to the present invention, since the guide 14 is held by the hook 29 so that the top of the guide 14 is kept in the reel 5, there occurs no separation of the guide 14 out of the reel 5 even if the tongues 16 and the projections 17 press the end portion of the film against the guide 14, and the film is guided tightly along the guide 14 thereby assuring the winding operation of the film by the reel. After the end portion of the film is coiled round the drum of the reel, the guide 14 is released from restriction of the hook 29 by the tension of the film, and the guide 14 is quickly removed from the reel 5 by the action of its weight or the spring 32 and does not disturb further winding of the film.

The above embodiment is referred to as a winding mechanism only of a projector but it must be understood that the same guiding device will be utilized for any other similar mechanism, e.g., that of a tape recorder.

What is claimed is:

1. A device for guiding a film strip to a takeup reel of a projector and the like, comprising:
   means provided in said takeup reel for automatically taking up the leading end of the film strip;
   an elongated guide plate means for guiding the leading end of the film strip toward a core of the takeup reel, said elongated guide plate means pivotally mounted on the projector and adapted to be positioned within said takeup reel and to withdraw therefrom;
   a link member pivotally mounted on said projector;
   holding means operatively coupled to said link member for releasably holding said guide plate means within said takeup reel, whereby the leading end of the film is directed toward the core of the takeup reel;
   spring means interposed between said link member and said projector and cooperating with said holding means; and
   guide roller means for guiding the film strip to said guide plate means, said guide roller means rotatably mounted on said link member, said link member adapted to pivot toward said guide plate means against said spring means due to tension of the film strip acting on said guide roller means when the leading end of the film strip is taken up by the core of the takeup reel, thereby releasing said guide plate means from said holding means, whereby said guide plate means pivotally withdraws from said takeup reel.

2. A device for guiding a film strip as claimed in claim 1, wherein said holding means is comprised of a hook, said hook being connected to said link so as to turn simultaneously therewith, and further comprising pivot means operatively positioned for mounting said guide plate means on the projector and a pin member coupled to and parallel to said pivot means, said hook being engageable with said pin member.

3. A device for guiding a film strip as claimed in claim 2, wherein said hook is pivotally connected to said link member and being spring-biased away from the guide plate means, a stop being provided on said hook so as to abut on the inward edge of said link member, thereby enabling said hook to turn away from said guide plate means when disengaged from said pin member.

4. A device for guiding a film strip as claimed in claim 1, further comprising a spring member operatively connected for spring biasing said guide plate means such that said guide plate means turns away from the takeup reel when said holding means rleases the guide plate means.

5. A device for guiding a film strip as claimed in claim 1, wherein the upper edge of said hook is slanted downwardly toward the guide plate means so as to be readily engageable with said pin.

* * * * *